United States Patent [19]

Brendel

[11] Patent Number: 5,608,173
[45] Date of Patent: Mar. 4, 1997

[54] FORCE MEASURING APPARATUS HAVING ELECTRICALLY-INSULATED LOAD BEARING SURFACES

[75] Inventor: Albert E. Brendel, Lake Orion, Mich.

[73] Assignee: Sensor Developments, Inc., Lake Orion, Mich.

[21] Appl. No.: 475,697

[22] Filed: Jun. 7, 1995

[51] Int. Cl.⁶ .................................................. G01L 1/04
[52] U.S. Cl. ............................. 73/862.628; 73/862.625; 73/763
[58] Field of Search ................................ 73/763, 767, 768, 73/772, 774, 775, 776, 862.628, 862.625

[56] References Cited

U.S. PATENT DOCUMENTS

| | | |
|---|---|---|
| 3,676,754 | 7/1972 | Maserjian et al. . |
| 3,723,258 | 3/1973 | Podell et al. . |
| 4,048,005 | 9/1977 | Nakagome et al. . |
| 4,106,370 | 8/1978 | Kraus et al. ............................ 73/761 |
| 4,157,032 | 6/1979 | Schaberg . |
| 4,472,620 | 9/1984 | Nied . |
| 4,480,488 | 11/1984 | Read et al. .......................... 73/862.68 |
| 4,485,683 | 12/1984 | Hass .................................. 73/862.628 |
| 4,546,229 | 10/1985 | Leone . |
| 4,650,951 | 3/1987 | Koga et al. . |
| 4,747,456 | 5/1988 | Kitagawa et al. . |
| 4,838,369 | 6/1989 | Albert . |
| 5,164,065 | 11/1992 | Bettencourt et al. . |
| 5,184,520 | 2/1993 | Naito .................................. 73/862.623 |
| 5,347,099 | 9/1994 | Gissinger et al. . |
| 5,360,958 | 11/1994 | Bogue et al. . |
| 5,375,471 | 12/1994 | Blazic et al. ............................. 73/767 |
| 5,393,950 | 2/1995 | Killian . |

Primary Examiner—Hezron E. Williams
Assistant Examiner—Max H. Noori
Attorney, Agent, or Firm—Dykema Gossett PLLC

[57] ABSTRACT

An electrical insulator having high mechanical strength is disclosed for use in connection with a force sensor body portion of a weld probe force gage. The force sensing body includes a pair of pockets for receiving a corresponding pair of welding electrodes. The pockets are lined with one or more anodized aluminum alloy inserts. Disposed upon each surface of each insert is a layer of oxide, which acts as an electrical insulator. The inserts are bonded to the receiving pockets so that one layer of oxide is internally disposed between the receiving pocket and the electrode. The force sensor body is fabricated from an aluminum alloy and anodized to form a second oxide layer between the receiving pockets and the inserts. The inserts protect the two oxide layers from external mechanical wear from welding electrodes.

7 Claims, 1 Drawing Sheet

FORCE MEASURING APPARATUS HAVING ELECTRICALLY-INSULATED LOAD BEARING SURFACES

BACKGROUND OF THE INVENTION

1. Field of the Invention

This invention relates generally to an electrical insulating structure having high mechanical strength, and more particularly to a system employing the insulating properties of anodized aluminum to insulate a weld probe force gage from weld current damage.

2. Background Art

In resistance welding, a pair of axially opposed welding electrodes are employed to clamp two workpieces being welded together in a fixed position with a predetermined force, and are further provided for passing a welding current through the workpieces to form a weld nugget—the fused metal that unites the workpieces. Although resistance welding machines typically have means for presetting and achieving a desired weld clamping force, this setting may change during operation. Accordingly, a weld probe force gage is used to determine the clamping or "squeeze" force exerted by the two electrodes. Such a weld probe force gage is used to either preset the desired applied force prior to operation, or alternatively is used to periodically monitor the applied clamping force during operation to ensure that it is within specified tolerances.

In operation, such a weld probe force gage is first inserted between the two electrodes of a welding machine. The electrodes are then clamped onto force application surfaces (generally receiving pockets) of a force sensor body of the gage. By way of a strain gage, a hydraulic pressure gage, or other transducer, the applied force is determined.

Conventional practice dictates that the application of welding current be disabled while the weld probe force gage is being used to prevent damage to the probe caused by excessive weld current. Notwithstanding the foregoing, weld current is nonetheless sometimes applied between the electrodes. For example, weld current is sometimes accidentally applied by the operator while the force gage is being used. Further, particular welding machines are not equipped with a welding current disable feature, which makes activation of the welding event to close the welding jaws to measure the clamping force impossible without also initiating welding current.

To protect the force gage from damage due to inadvertent or unavoidable current flow, others in the art have taken the approach that such currents can be safely shunted through the probe. Accordingly, force gages have been constructed of highly conductive materials, such as copper alloys, which are believed to have the ability to safely carry the applied welding currents. However, force gages constructed from such alloys not only increases the weight of the probe, but its material cost as well.

Accordingly, there is a need to provide a weld probe force gage that reduces or eliminates one or more of the problems as stated above.

SUMMARY OF THE INVENTION

It is the object of this invention to provide an electrical insulator having high mechanical strength for use with a workpiece having a load bearing surface. A preferred embodiment of the present invention accomplishes this objective by providing an anodized aluminum alloy sheet (including a layer of oxide) that is secured to the workpiece so that the oxide layer is "sandwiched" between the load-bearing surface and a surface of the aluminum sheet opposite the oxide layer. The "sandwich" structure protects the oxide layer from external contact and mechanical wear and penetration. It is a further object of this invention to provide a force sensing apparatus having one or more insulated force application points. It is still a further object of this invention to provide an electrically insulated weld probe force gage for measuring and outputting an exerted force between two welding electrodes of a resistance welding machine. The latter two objectives are achieved by bonding an insulator, and particularly an anodized aluminum alloy sheet having an oxide layer on one surface, oxide layer-side down, to the force application points of the force sensor.

These and other features and objects of this invention will become apparent to one skilled in the art from the following detailed description and the accompanying drawings illustrating features of this invention by way of example.

DESCRIPTION OF THE PREFERRED AND ALTERNATIVE EMBODIMENTS

Figure 1:
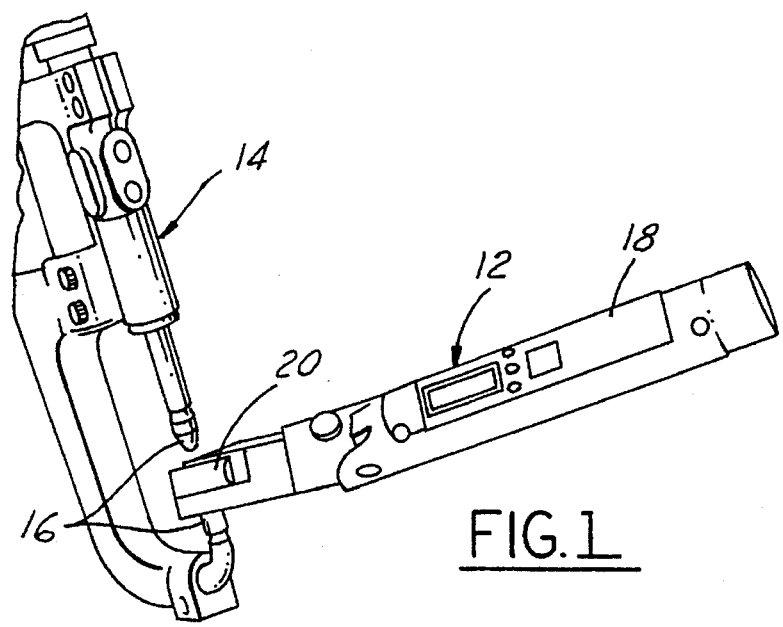
FIG. 1 is a simplified perspective view of a weld probe force gage having a force sensing body according to the present invention illustrating the gage in a preferred environment positioned to measure the clamping force between electrodes of a resistance welding machine.
Figure 2:
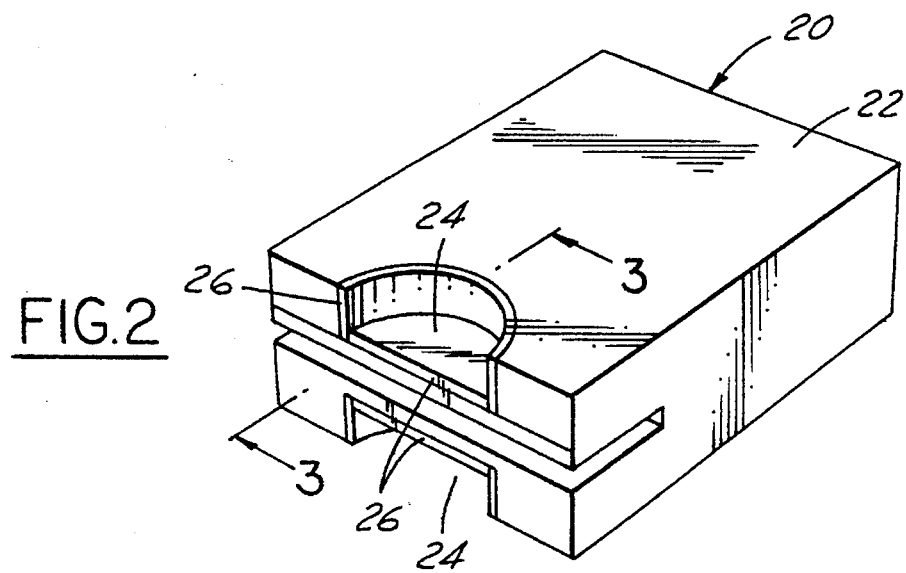
FIG. 2 is a simplified, enlarged, perspective view of the force sensing body depicted in FIG. 1, illustrating a pair of receiving pockets formed in the body and corresponding aluminum alloy inserts bonded in the receiving pockets.
Figure 3:
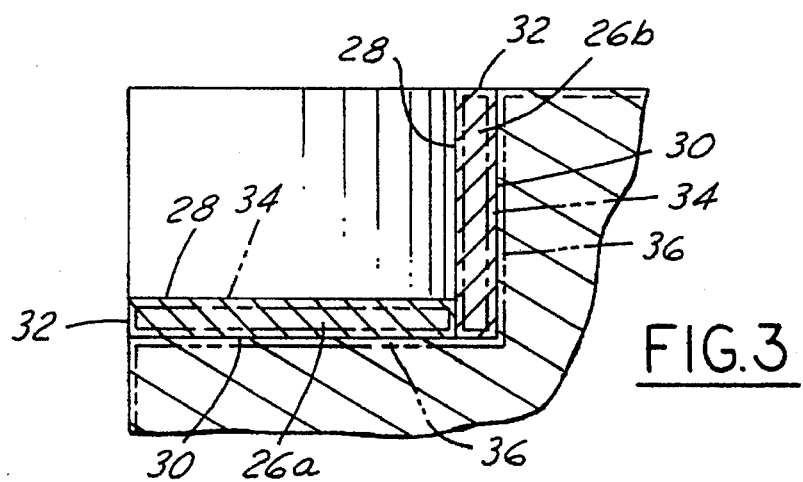
FIG. 3 is a simplified, partial cross-sectional view of the force sensing body of FIG. 2 taken substantially along line 3—3, showing the upper receiving pocket with an oxide layer disposed thereon, and an aluminum alloy sheet with an oxide layer disposed thereon, the sheet being received in the pocket oxide layer-side down.

FIG. 1 shows a weld probe force gage 12 in operation with a resistance welding machine 14. The resistance welding machine has two axially-opposed welding electrodes 16. Gage 12 is provided for measuring and outputting a clamping force applied between electrodes 16, and includes a gage or probe body 18 and a force sensor 20.

The gage body 18 is connected to and in communication with the sensor 20. The gage body 18 is responsive to an input signal from and generated by the sensor 20 which represents the detected clamping force between electrodes 16. Gage body 18 may display the detected force to a user. The functions performed by the gage body 18 are well-known and conventional in the art and the gage body 18 used in the constructed embodiment is commercially available in combination with a force sensor 20 from Sensor Developments Inc., Lake Orion, Mich., referred to as a Weld Probe Force Gage, Model 90061.

Force sensor 20 includes a sensor body 22, two receiving pockets 24, and two inserts 26. Each insert 26 consists of a horizontal insert 26a and a vertical insert 26b. Each insert includes an outer surface 28, an inner surface 30, edge surfaces 32, and an oxide layer 34. Force sensor body 22 may further include an oxide layer 36.

In the preferred embodiment, two receiving pockets 24 are oppositely disposed on body 22, adapted in size and geometry to engage electrodes 16 of weld machine 14. Each receiving pocket 24 is completely lined with an insert 26 for completely insulating conductive surfaces of body 22 from an energized electrode 16. The insert 26 of the constructed embodiment consists of two abutting pieces, horizontal inserts 26a and 26b. Inserts 26a and 26b may be unitary depending on the shape of the pockets 24, provided that each pocket 24 is completely covered by its corresponding insert 26. Though the total thickness of the insert 26 may vary depending upon the application, in particular depending upon the desired degree of resistance to penetration (i.e. pounds of force), inserts 26, in the constructed embodiment, are 0.02 inches (0.51 mm) to 0.03 inches (0.76 mm) thick and have been found satisfactory for applications up to 3000 pounds (1360 kg) of applied force as measured between electrodes 16.

In the constructed embodiment, both inserts 26 are fabricated from aluminum alloy 2024 and "hard anodized", a process well-known in the art. The anodizing process creates an oxide layer 34 on the external surfaces of insert 26, including outer surface 28, inner surface 30, and edge surfaces 32. Depending upon its thickness, oxide layer 34 acts as an electrical insulator for normally encountered welding voltages/currents. The thickness of the oxide layer 34 is process dependent (i.e., can be varied by controlling the anodizing process, which is also well-known in the art) and can be varied depending upon the required level of insulation, provided that the oxide layer 34 is thick enough to be relatively nonconducting for the desired application. For example, the prior art teaches that an oxide layer having a thickness of 0.000059 inches (1.5 microns) is insufficient to insulate against a welding current of 25,000 amps (i.e., such an oxide layer may be sufficient to carry such current). Accordingly, in the constructed embodiment, oxide layers 34 ranging from 0.002 to 0.003 inches (51 to 76 microns) thick have been used and found sufficient to insulate sensor body 22 from up to 50,000 amps of welding current. The method of determining a suitable oxide thickness that is relatively electrically nonconductive depends upon the desired maximum safe current, which in turn may be a function of the conductivity (composition) of the force sensing body being used.

Inner surfaces 30 are secured to the surfaces of the pockets 24, preferably by an adhesive bonding material, though other methods of securing are possible. In the constructed embodiment, a commercially available 2-part epoxy adhesive is used to bond inner surfaces 30 to pockets 24.

In the preferred embodiment, sensor body 22 is itself fabricated from aluminum alloy 2024 and "hard anodized", creating oxide layer 36 disposed about the surface of body 22, including both pockets 24. Thus, in the preferred embodiment, oxide layers 34 and oxide layers 36 are disposed adjacent to each other and "sandwiched" between pockets 24 and inserts 26.

In operation, electrodes 16 are clamped about force sensor 20 by placing each electrode 16 in a corresponding pocket 24. Contact is made between electrodes 16 and oxide layers 34 disposed about outer surfaces 28. The oxide layers 34 on outer surfaces 28 are thin and susceptible to mechanical wear and penetration. Therefore, such layers are not relied upon to insulate sensor 20 from the damaging effects of excessive weld current. However, the oxide layers 34 disposed on inner surfaces 30 and the oxide layers 36 disposed on the pockets 24, though also thin, are protected against damaging contact by electrodes 16 by inserts 26. Therefore, these two oxide layers are imbedded and not susceptible to mechanical wear or penetration. Thus, sensor 20 is insulated from current flow by the combination of oxide layers 34 disposed on the inner surfaces 30 and the oxide layers 36 disposed on the pockets 24. Although either one of these two "protected" oxide layers alone on either pocket 24 would be sufficient to effectively insulate force sensor 20, the preferred embodiment includes both "protected" oxide layers on both pockets 24 for improved electrical insulation against damaging current flow.

When resistance welding machine 14 is activated, electrodes 16 together exert a force upon pockets 24. The sensor 20 detects the exerted force and communicates a representative signal to gage body 12, which in turn outputs the detected force to the user.

Alternative embodiments may include employing additional inserts 26 which may be added by securing them together in series such that the inner surface 30 of one insert 26 is bonded to the outer surface 28 of another insert The described weld probe force gage offers several advantages over the prior art. Because of the high level of insulation offered by the oxide layers, it is possible for the constructed embodiment to be fabricated from an aluminum alloy rather than a copper alloy, thus reducing both its weight and the cost to manufacture it. Furthermore, not only is the described force gage capable of withstanding at least 50,000 amps of weld current without experiencing damage to the force sensor, it is capable of withstanding at least 3000 pounds of clamping force without damage to the insulating oxide layers.

The preceding description is exemplary rather than limiting in nature. A preferred embodiment of this invention has been disclosed to enable one skilled in the art to practice this invention. Variations and modifications are possible without departing from the purview and spirit of this invention; the scope of which is limited only by the appended claims.

What is claimed is:

1. An apparatus for measuring force, comprising:

a force sensing body having first and second force application surfaces for determining an externally-supplied force applied therebetween; and, insulator means disposed on one of said first and second force application surfaces for providing electrical insulation between said first and second surfaces;

wherein said insulator means includes an anodized insert comprising aluminum, said insert having first and second opposing surfaces and a relatively electrically nonconductive oxide layer on said second opposing surface of said insert, said insert being disposed on said one force application surface such that said oxide layer is sandwiched between said one force application surface and said first opposing surface of said insert, said insert providing a mechanical barrier to said externally-applied force to thereby protect said oxide layer.

2. The apparatus of claim 1 further including a second anodized insert comprising aluminum, said second insert having third and fourth opposing surfaces and a relatively electrically nonconductive second oxide layer on said fourth opposing surface, said second insert being disposed on said first insert such that said second oxide layer is sandwiched between said first opposing surface and said third opposing surface, said second insert providing a second mechanical barrier to said externally-applied force to thereby protect said first and second oxide layers.

3. The apparatus of claim 1 wherein said force sensing body comprises aluminum, and wherein said one force application surface is anodized to provide a relatively electrically nonconductive second oxide layer thereon, said insulator means including said second oxide layer.

4. An apparatus for measuring and outputting a clamping force applied between a pair of axially-opposed welding electrodes having electrical isolation to existent welding currents, comprising:

a force sensing body having first and second force application surfaces for being contacted by a respective one of the welding electrodes for determining a clamping force in response thereto;

a probe body responsive to said determined clamping force for providing an output indicative of said determined clamping force; and, insulator means disposed on one of said first and second force application surfaces for providing electrical insulation between said first and second surfaces to substantially reduce welding currents between the welding electrodes;

wherein said insulator means includes an anodized aluminum insert, said insert having first and second opposing surfaces and a relatively electrically nonconductive oxide layer on said second opposing surface such that said oxide layer is sandwiched between said one force application surface and said first opposing surface of said insert, said insert providing a mechanical barrier to said externally-applied force to thereby protect said oxide layer.

5. The apparatus of claim 4 further including a second anodized aluminum insert, said second insert having third and fourth opposing surfaces and a relatively electrically nonconductive second oxide layer on said fourth opposing surface, said second insert being disposed on said first insert such that said second oxide layer is sandwiched between said first opposing surface and said third opposing surface, said second insert providing a second mechanical barrier to said externally-applied force to thereby protect said first and second oxide layers.

6. The apparatus of claim 4 wherein said force sensing body is aluminum, and wherein said one force application surface is anodized to provide a relatively electrically nonconductive second oxide layer thereon, said insulator means including said second oxide layer.

7. The apparatus of claim 4 wherein said insert defines a semi-circularly shaped force application surface.

* * * * *